Dec. 18, 1956 W. B. WATKINS 2,774,295
RIBBED GRILL
Filed Dec. 13, 1952
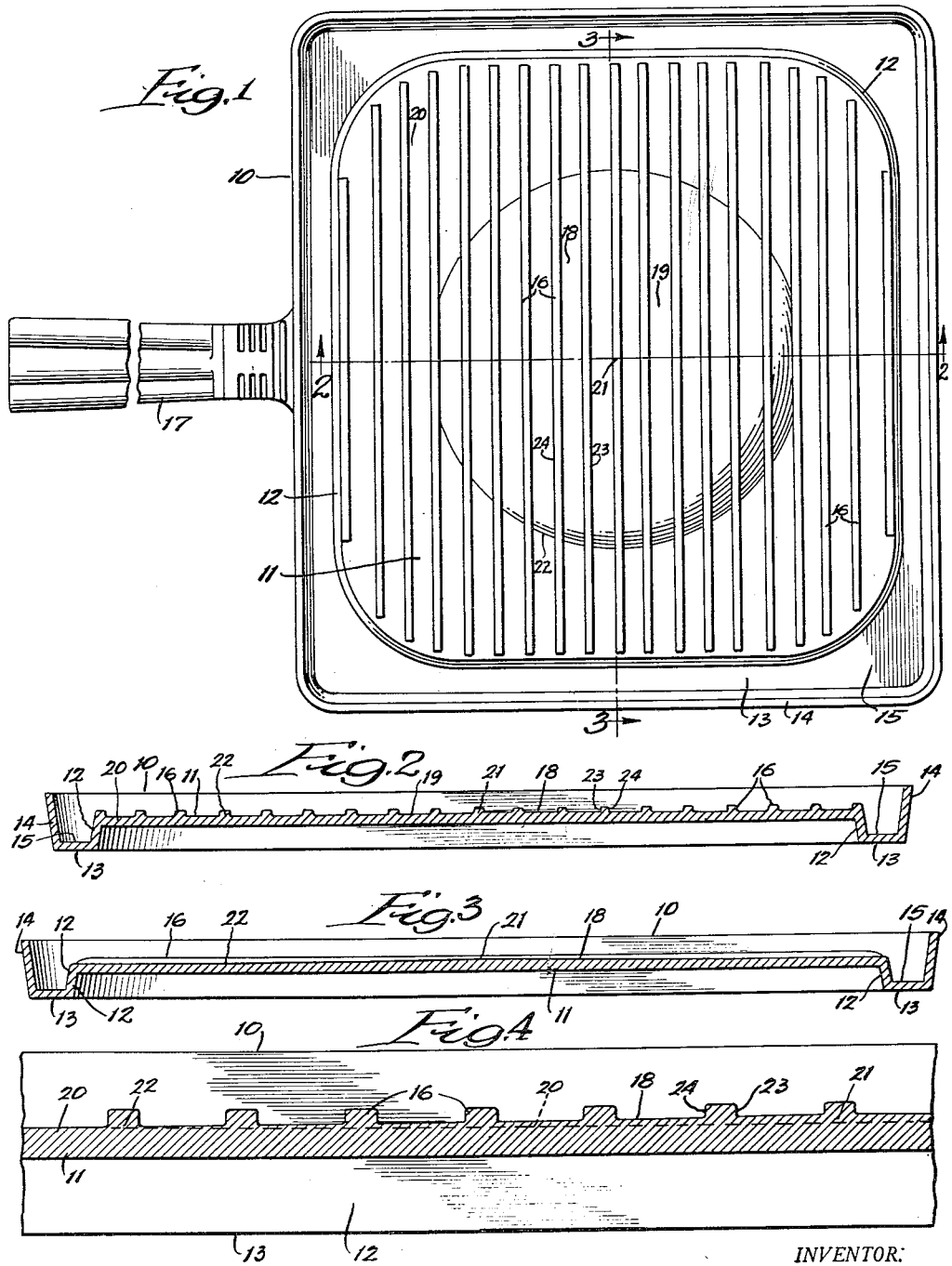
INVENTOR:
William B. Watkins,
BY
Owen, McDougall, Williams & Hersh,
ATTORNEYS.

United States Patent Office 2,774,295
Patented Dec. 18, 1956

2,774,295

RIBBED GRILL

William B. Watkins, Evanston, Ill., assignor to The Wm. B. Watkins Co., a corporation of Illinois Application December 13, 1952, Serial No. 325,853

1 Claim. (Cl. 99—425)

This invention relates to cooking utensils such as griddles and grills, and more particularly to an improvement in a ribbed grill.

In the cooking of certain foods which have a relatively high fat content, such as bacon or sausage, it is desirable at times to keep the food out of the grease which is forced out of it by the heat. This has been relatively easy to accomplish when the food is to be cooked by heat which is above the food. In this situation, a wire grill is employed to support the food, and the grease drops through. However when the food is to be cooked by heat which is below the food, the solution to the problem is not as easy to accomplish.

The usual frying pan has a flat bottom in which the grease collects relatively uniformly. In cooking bacon or sausages in such a frying pan, the usual practice is to pour off the excess grease periodically. However, this only solves the problem for a relatively short period of time.

An improvement in bacon fryers, but upon which food such as sausages can hardly be cooked, is shaped as a section of a cylinder, and the bacon is draped circumferentially on the outside of the cylinder. The grease runs off the cylinder and the bacon is cooked in a relatively dry condition. However, due to the wall shape, sausages and meat patties cannot be cooked on such a grill.

The usual ribbed grill, of which this invention is an improvement, also has certain disadvantages. The food will rest on the ribs and the grease will run into the channels defined by the ribs. However, since the channels are flat, there is quite a volume of grease which stands in the channels, and does not drain off into the outer grease-receiving and collecting cavity. This grease which remains in the first channels tends to keep the food in a moistened, greasy condition, thereby defeating the purpose of the ribbed construction. If the ribs are formed of a height sufficient to keep the food out of the grease which remains in the channels, the cooking of the food becomes very difficult because heat is transmitted at a relatively high rate through the ribs, but at a relatively low rate through the air above the channels between the ribs.

It is therefore an object of this invention to provide a ribbed grill having a series of pitched channels defined between the ribs.

A further object is to provide a ribbed grill having pitched channels of differing length and height.

A further object is to provide a ribbed grill having pitched channels defined between the ribs of a portion of its surface, and unpitched channels defined between the ribs of the remainder of its surface.

A further object is to provide a ribbed grill in which the pitch of the channel bottoms is defined in uniform manner as a conical surface which tapers into the remainder of the grill surface without perceptible edge definition.

Further objects and advantages will be apparent from a consideration of the following specification in connection with the accompanying drawings, in which, Fig. 1 is a plan view of a ribbed grill constructed according to this invention, Fig. 2 is a view in section on the line 2—2 of Fig. 1, Fig. 3 is a view in section on the line 3—3 of Fig. 1, and Fig. 4 is a view of a portion of the grill shown in Fig. 2, but on a much larger scale.

As shown in the drawings, the grill 10 has a central cooking surface 11 supported by an upstanding wall 12 which, together with a base portion 13 and an outer wall 14 define an outer grease receiving cavity 15.

In use, the ribbed grill supports food above the cooking surface 11, and, as the applied heat drives the grease from the food onto the surface 11, it is desired that the grease move along the channels defined by the ribs 16 and into the cavity 15. It is possible to move the grill 10 occasionally, through using the handle 17, to tilt the surface 11 so that the grease will run out of the defined channels into the cavity 15. However, this invention eliminates the necessity of this tilting.

To provide a suitable pitch in the channels 18, and especially in the central area of the cooking surface 11, a substantially circular portion 19 of the cooking surface 11 is formed with greater thickness than the surrounding portion 20. The portion 19 is thickest adjacent the center 21 of the grill 10 and tapers uniformly in all directions to its outer annular edge 22. The annular edge 22 is preferably indistinguishable in the finished article, and is perceptible only through a cross sectional measurement.

By providing a conical shape for the portion 19, the drainage of fat away from the center 21 is continuous toward the edge 22 in directions parallel to the ribs 16, and also drains away from the center 21 toward the ribs 16 in other directions. This drainage action will cause the grease to move toward the inner wall 23 of the ribs 16 and then toward the edge 22. This will cause the area of the channel 18 adjacent the outer wall 24 to be kept relatively dry.

By providing a central portion 19 from which the exuded grease will be drained relatively rapidly, and an outer portion 20 which will tend to retain some of the grease, by reason of its having channels 18, the bottoms of which are flat, I have provided a single utensil having differing surfaces upon which varying types of cooking may be conducted. Under these conditions, it is possible to cook food at differing speeds and in differing grease conditions on the same utensil.

Having described my invention what I desire to protect by Letters Patent and claim is:

A cooking utensil, comprising an upstanding outer peripheral wall joined to an inwardly extending base wall and an elevated, generally rectangular, food receiving cooking member having a depending peripheral wall joined integrally to said base wall to define a peripheral grease receiving cavity, said cooking member having a level peripheral area portion of uniform thickness and a generally circular central portion within said peripheral area of progressively greater thickness providing an upper surface sloping downwardly from generally the center of the utensil to said level peripheral area portion, said level peripheral area portion being of varying width around the central portion and both of said portions having a width to receive and hold food to be cooked, a plurality of generally parallel spaced ribs extending across the food receiving cooking member in raised relation to said upper surface, some of said ribs extending across the portion of uniform thickness without intersecting the central portion having the downwardly sloping surface, said ribs being arranged for supporting food to be cooked at least partially above said upper surface, said sloping and level surface portions between the ribs providing for drainage of food exuded liquids to said cavity, said sloping surface portions between the ribs having varying downward gradients whereby said drainage occurs at relatively different rates and provides areas on the cooking surface for selective rates and conditions of cooking, and a substantially flat surface on the side of said cooking member opposite said ribs for cooking food when the utensil is inverted.

References Cited in the file of this patent

UNITED STATES PATENTS

| | | |
|---|---|---|
| 1,447,813 | Patrick | Mar. 6, 1923 |
| 1,733,450 | Detweiler | Oct. 29, 1929 |
| 2,008,767 | Munn | July 23, 1935 |
| 2,198,647 | Wolcott | Apr. 30, 1940 |
| 2,328,978 | Hennessy | Sept. 7, 1943 |
| 2,554,412 | Kavanagh | May 22, 1951 |